(12) United States Patent
Stanhope et al.

(10) Patent No.: US 11,793,187 B2
(45) Date of Patent: Oct. 24, 2023

(54) SYSTEM AND METHOD FOR MONITORING AGRICULTURAL FLUID DEPOSITION RATE DURING A SPRAYING OPERATION

(71) Applicant: CNH Industrial America LLC, New Holland, PA (US)

(72) Inventors: Trevor Stanhope, Oak Lawn, IL (US); Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 155 days.

(21) Appl. No.: 17/149,841

(22) Filed: Jan. 15, 2021

(65) Prior Publication Data

US 2022/0225603 A1  Jul. 21, 2022

(51) Int. Cl.
*A01M 7/00* (2006.01)

(52) U.S. Cl.
CPC .......... *A01M 7/0089* (2013.01); *A01M 7/006* (2013.01); *A01M 7/0053* (2013.01)

(58) Field of Classification Search
CPC ... A01M 7/0089; A01M 7/0053; A01M 7/006
See application file for complete search history.

(56) References Cited

U.S. PATENT DOCUMENTS

| | | | |
|---|---|---|---|
| 5,348,226 A | 9/1994 | Heiniger et al. | |
| 6,791,488 B2 | 9/2004 | Diekhans et al. | |
| 8,838,273 B2 | 9/2014 | Hvass et al. | |
| 8,843,283 B2 | 9/2014 | Strelioff et al. | |
| 8,942,893 B2 * | 1/2015 | Rosa | A01M 7/0057 239/164 |
| 9,532,563 B2 * | 1/2017 | Arenson | A01M 7/0089 |
| 9,740,208 B2 * | 8/2017 | Sugumaran | G05D 1/0094 |
| 9,945,957 B2 * | 4/2018 | Gattis | A01C 23/008 |
| 10,569,612 B2 * | 2/2020 | Bittner | B60G 17/0416 |
| 10,842,067 B2 * | 11/2020 | Weidenbach | A01G 25/09 |
| 11,219,912 B2 * | 1/2022 | Bharatiya | G01S 13/04 |
| 11,241,004 B2 * | 2/2022 | Bharatiya | A01M 7/0042 |
| 11,375,706 B2 * | 7/2022 | Kiefer | A01M 7/0057 |
| 11,383,728 B2 * | 7/2022 | Stanhope | B60W 50/082 |
| 2009/0099737 A1 | 4/2009 | Wendte et al. | |

(Continued)

FOREIGN PATENT DOCUMENTS

| | | |
|---|---|---|
| CN | 107616076 A | 1/2018 |
| CN | 107631756 A | 1/2018 |
| WO | WO 2018/210669 | 11/2018 |

*Primary Examiner* — Joseph A Greenlund
(74) *Attorney, Agent, or Firm* — Rebecca Henkel; Rickard DeMille (57) ABSTRACT

A system for monitoring the operation of an agricultural sprayer includes a computing system is configured to determine a movement parameter associated with the movement of a boom assembly of the agricultural sprayer relative to a frame of the agricultural sprayer based on data captured by a movement sensor. Furthermore, the computing system is configured to determine the distance between a spray nozzle of the agricultural sprayer and the underlying crop canopy or field surface based on data captured by a position sensor. Additionally, the computing system is configured to determine a spray deposition parameter indicative of a rate at which agricultural fluid is deposited on the underlying crop canopy or field surface based on the determined movement parameter and the determined distance.

17 Claims, 4 Drawing Sheets

(56) References Cited

U.S. PATENT DOCUMENTS

| | | | |
|---|---|---|---|
| 2013/0105591 A1* | 5/2013 | Peterson | A01B 79/005 239/71 |
| 2015/0375247 A1* | 12/2015 | Funseth | B05B 1/20 239/69 |
| 2016/0175869 A1* | 6/2016 | Sullivan | B05B 1/20 239/11 |
| 2016/0316617 A1 | 11/2016 | Leed et al. | |
| 2017/0016870 A1* | 1/2017 | McPeek | G01S 17/89 |
| 2018/0052088 A1* | 2/2018 | Sarkar | G01N 15/0227 |
| 2018/0263196 A1* | 9/2018 | Boucher | A01G 7/06 |
| 2019/0082598 A1* | 3/2019 | Seiders, Jr. | A01D 41/141 |
| 2019/0128864 A1* | 5/2019 | Pickett | A01C 21/007 |
| 2019/0357518 A1* | 11/2019 | Bharatiya | A01M 7/0042 |
| 2019/0358660 A1* | 11/2019 | Paralikar | A01M 7/0089 |
| 2020/0290635 A1* | 9/2020 | Stanhope | A01B 73/065 |
| 2021/0016309 A1* | 1/2021 | Bremer | B05B 12/004 |
| 2021/0289693 A1* | 9/2021 | Harmon | B05B 1/20 |
| 2022/0125033 A1* | 4/2022 | Long | B05B 12/12 |
| 2022/0132723 A1* | 5/2022 | Anderson | A01B 79/005 701/25 |
| 2022/0174934 A1* | 6/2022 | Germain | A01B 79/005 |
| 2022/0183208 A1* | 6/2022 | Sibley | G06T 7/194 |
| 2022/0192084 A1* | 6/2022 | Mizushima | A01C 21/007 |
| 2022/0192174 A1* | 6/2022 | Humpal | B05B 12/124 |
| 2022/0211025 A1* | 7/2022 | Smith | G05B 15/02 |
| 2022/0225603 A1* | 7/2022 | Stanhope | A01M 7/006 |

\* cited by examiner

SYSTEM AND METHOD FOR MONITORING AGRICULTURAL FLUID DEPOSITION RATE DURING A SPRAYING OPERATION

FIELD OF THE INVENTION

The present disclosure generally relates to agricultural sprayers and, more particularly, to systems and methods for monitoring the deposition rate of an agricultural fluid onto a crop canopy or a field surface during an agricultural spraying operation performed by an agricultural sprayer.

BACKGROUND OF THE INVENTION

Agricultural sprayers apply an agricultural fluid (e.g., a pesticide) onto crops as the sprayer is traveling across a field. To facilitate such travel, sprayers are configured as self-propelled vehicles or implements towed behind an agricultural tractor or other suitable agricultural vehicle. A typical sprayer includes a boom assembly on which a plurality of spaced apart spray nozzles is mounted. Each spray nozzle is configured to dispense or otherwise spray the agricultural fluid onto underlying crop canopy or field surface.

It is generally desirable that the agricultural fluid be deposited on the underlying crop canopy or field surface at an even target rate to achieve a specified agricultural outcome (e.g., a reduction in weed coverage or pest activity). However, as the sprayer travels across the field to perform a spraying operation, the boom assembly may move relative to the frame of the sprayer on which it is mounted. For example, such movement may be caused by wind, bumps/divots within the field, and/or the like. Movement of the boom assembly relative to the sprayer frame may, in turn, result in uneven deposition of the agricultural fluid on the underlying crop canopy or field surface, which is known as "tiger-striping." Such uneven deposition of the agricultural fluid may result in portions of the field receiving too much agricultural fluid and other portions of the field receiving too little agricultural fluid, thereby reducing the effectiveness of the agricultural fluid.

Accordingly, an improved system and method for monitoring the deposition rate of an agricultural fluid onto a crop canopy or a field surface during an agricultural spraying operation performed by an agricultural sprayer would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring agricultural fluid deposition rate during an agricultural spraying operation. The system includes a sprayer frame and a boom assembly coupled to the sprayer frame, with the boom assembly extending in a lateral direction between a first end of the boom assembly and a second end of the boom assembly, the lateral direction being perpendicular to a direction of travel of the sprayer frame. Furthermore, the system includes a spray nozzle supported on the boom assembly, with the spray nozzle configured to dispense an agricultural fluid onto an underlying crop canopy or field surface. Additionally, the system includes a movement sensor configured to capture data indicative of movement of the boom assembly relative to the sprayer frame. Moreover, the system includes a position sensor configured to capture data indicative of a distance between the spray nozzle and the underlying crop canopy or field surface. In addition, the system includes a computing system communicatively coupled to the movement sensor and the position sensor. In this respect, the computing system is configured to determine a movement parameter associated with the movement of the boom assembly relative to the sprayer frame based on the data captured by the movement sensor. Furthermore, the computing system is configured to determine the distance between the spray nozzle and the underlying crop canopy or field surface based on the data captured by the position sensor. Additionally, the computing system is configured to determine a spray deposition parameter indicative of a rate at which the agricultural fluid is deposited on the underlying crop canopy or field surface based on the determined movement parameter and the determined distance.

In another aspect, the present subject matter is directed to an agricultural sprayer. The agricultural sprayer includes a frame, a boom assembly coupled to the frame, with the boom assembly extending in a lateral direction between a first end of the boom assembly and a second end of the boom assembly, the lateral direction being perpendicular to a direction of travel of the agricultural sprayer. Furthermore, the agricultural sprayer includes a plurality of spray nozzles supported on the boom assembly and spaced apart from each other in the lateral direction, with each spray nozzle configured to dispense an agricultural fluid onto an underlying crop canopy or field surface. Additionally, the agricultural sprayer includes one or more movement sensors configured to capture data indicative of movement of the boom assembly relative to the sprayer frame. Moreover, the agricultural sprayer includes one or more position sensors configured to capture data indicative of a distance between each spray nozzle and the underlying crop canopy or field surface. In addition, the agricultural sprayer includes a computing system communicatively coupled to the one or more movement sensor and the one or more position sensors. In this respect, the computing system is configured to determine a movement parameter associated with the movement of the boom assembly relative to the sprayer frame based on the data captured by the one or more movement sensors. Furthermore, the computing system is configured to determine the distance between each spray nozzle and the underlying crop canopy or field surface based on the data captured by the one or more position sensors. Additionally, the computing system is configured to determine one or more spray deposition parameters based on the determined movement parameter and the determined distance, with each spray deposition parameter being associated with a portion of the underlying crop canopy or field surface and indicative of rate at which the agricultural fluid is deposited on the corresponding portion of the underlying crop canopy or field surface.

In a further aspect, the present subject matter is directed to a method for monitoring agricultural fluid deposition rate during an agricultural spraying operation performed by an agricultural sprayer. The agricultural sprayer, in turn, includes a frame, a boom assembly coupled to the frame, and a spray nozzle supported on the boom assembly, with the spray nozzle configured to dispense an agricultural fluid onto an underlying crop canopy or field surface. The method includes receiving, with a computing system, movement sensor data indicative of movement of the boom assembly relative to the sprayer frame. Furthermore, the method includes determining, with the computing system, a movement parameter associated with the movement of the boom assembly relative to the sprayer frame based on the received movement sensor data. Additionally, the method includes receiving, with the computing system, position sensor data indicative of a distance between the spray nozzle and the underlying crop canopy or field surface. Moreover, the method includes determining, with the computing system, the distance between the spray nozzle and the underlying crop canopy or field surface based on the received position sensor data. In addition, the method includes determining, with the computing system, a spray deposition parameter indicative of a rate at which the agricultural fluid is deposited on the underlying crop canopy or field surface based on the determined movement parameter and the determined distance. Furthermore, the method includes controlling, with the computing system, an operation of the spray nozzle based on the determined spray deposition parameter.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring agricultural fluid deposition rate during an agricultural spraying operation. As will be described below, the agricultural spraying operation may be performed by an agricultural sprayer having a boom assembly on which a plurality of spray nozzles is mounted. Each spray nozzle may, in turn, be configured to dispense an agricultural fluid (e.g., a pesticide, nutrient, and/or the like) onto the underlying crop canopy or field surface. Moreover, the sprayer may include one or more movement sensors (e.g., an inertial measurement unit(s)) configured to capture data indicative of the movement of the boom assembly relative to a frame of the sprayer. In addition, the sprayer may include one or more position sensors (e.g., a transceiver-based sensor(s), such as an ultrasonic sensor(s)) configured to capture data indicative of the distance between each spray nozzle and the underlying crop canopy or field surface.

In accordance with aspects of the present subject matter, a computing system may be configured to determine one or more spray deposition parameters indicative of the rate at which the agricultural fluid is deposited on the underlying crop canopy or field surface. For example, the spray deposition parameter(s) may be the density of droplets (e.g., the number of droplets per unit of area) of the agricultural fluid deposited on a portion(s) of the underlying crop canopy or field surface. More specifically, in several embodiments, the computing system may determine one or more movement parameters associated with the movement of the boom assembly relative to the sprayer frame (e.g., pitch, roll, and/or yaw) based on the data captured by the movement sensor(s). Furthermore, in such embodiments, the computing system may determine the distance between each spray nozzle and the underlying crop canopy or field surface based on the data captured by the position sensor(s). The computing system may then determine one or more spray deposition parameters based on the determined movement parameter(s) and the distances. Each spray deposition parameter may, in turn, correspond to a portion of the crop canopy or field surface on which the agricultural fluid is being dispensed by the sprayer. Thereafter, the computing system may control the operation (e.g., the duty cycle) of the spray nozzles based on the determined spray deposition parameter(s).

Determining the spray deposition parameter(s) based on the movement of the boom relative to the sprayer frame and the distance(s) between the nozzles and the underlying crop canopy or field surface improves the operation of the sprayer and the effectiveness of the associated spraying operation. More specifically, conventional systems and methods generally rely on the analysis of captured image data to determine droplet density or other related spray deposition parameters. Such analysis of image data is time-consuming and requires a large amount of the computing resources. However, by using sensor data that is less computationally intensive to analyze than image data, the disclosed system and method can determine the spray deposition parameter(s) using fewer computing resources and in less time. As such, the disclosed system and method allow for the operation of the spray nozzle(s) to be adjusted more quickly in response to undesirable agricultural fluid deposition (e.g., droplet density) on the crop canopy/field surface. This, in turn, may allow for more even deposition of the agricultural fluid across the field, thereby improving the effectiveness of the agricultural fluid.

Referring now to the drawings, FIG. 1 illustrates a perspective view of one embodiment of an agricultural sprayer 10. In the illustrated embodiment, the agricultural sprayer 10 is configured as a self-propelled agricultural sprayer. However, in alternative embodiments, the agricultural sprayer 10 may be configured as any other suitable agricultural vehicle that dispenses an agricultural fluid (e.g., a pesticide or a nutrient) while traveling across a field, such as an agricultural tractor and an associated implement (e.g., a towable sprayer, an inter-seeder, a side-dresser, and/or the like).

Figure 1:
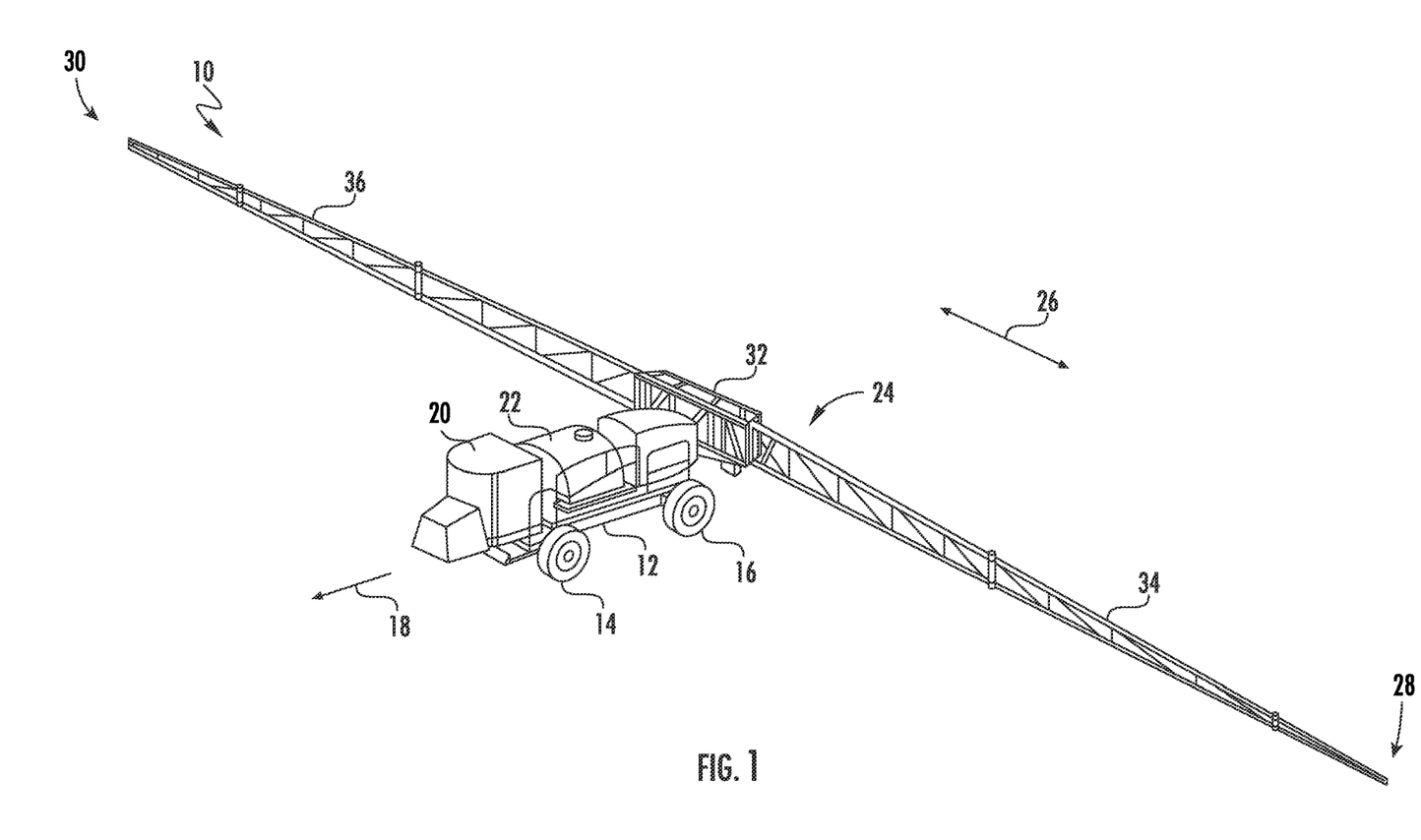
FIG. 1 illustrates a perspective view of one embodiment of an agricultural sprayer in accordance with aspects of the present subject matter.

As shown in FIG. 1, the agricultural sprayer 10 includes a frame or chassis 12 configured to support or couple to a plurality of components. For example, a pair of steerable front wheels 14 and a pair of driven rear wheels 16 may be coupled to the frame 12. The wheels 14, 16 may be configured to support the agricultural sprayer 10 relative to the ground and move the sprayer 10 in the direction of travel 18 across the field. Furthermore, the frame 12 may support an operator's cab 20 and a tank 22 configured to store or hold an agricultural fluid, such as a pesticide (e.g., a herbicide, an insecticide, a rodenticide, and/or the like), a fertilizer, or a nutrient. However, in alternative embodiments, the sprayer 10 may include any other suitable configuration. For example, in one embodiment, the front wheels 14 of the sprayer 10 may be driven in addition to or in lieu of the rear wheels 16.

Additionally, the sprayer 10 may include a boom assembly 24 mounted on the frame 12. In general, the boom assembly 24 may extend in a lateral direction 26 between a first lateral end 28 and a second lateral end 30, with the lateral direction being perpendicular to the direction of travel 18. In one embodiment, the boom assembly 24 may include a center section 32 and a pair of wing sections 34, 36. As shown in FIG. 1, a first wing section 34 extends outwardly in the lateral direction 26 from the center section 32 to the first lateral end 28. Similarly, a second wing section 36 extends outwardly in the lateral direction 26 from the center section 32 to the second lateral end 30. As will be described below, a plurality of spray nozzles 38 (FIG. 2) may be mounted on the boom assembly 24 and configured to dispense the agricultural fluid stored in the tank 22 onto the underlying crop canopy or field surface. However, in alternative embodiments, the boom assembly 24 may include any other suitable configuration.

Figure 2:
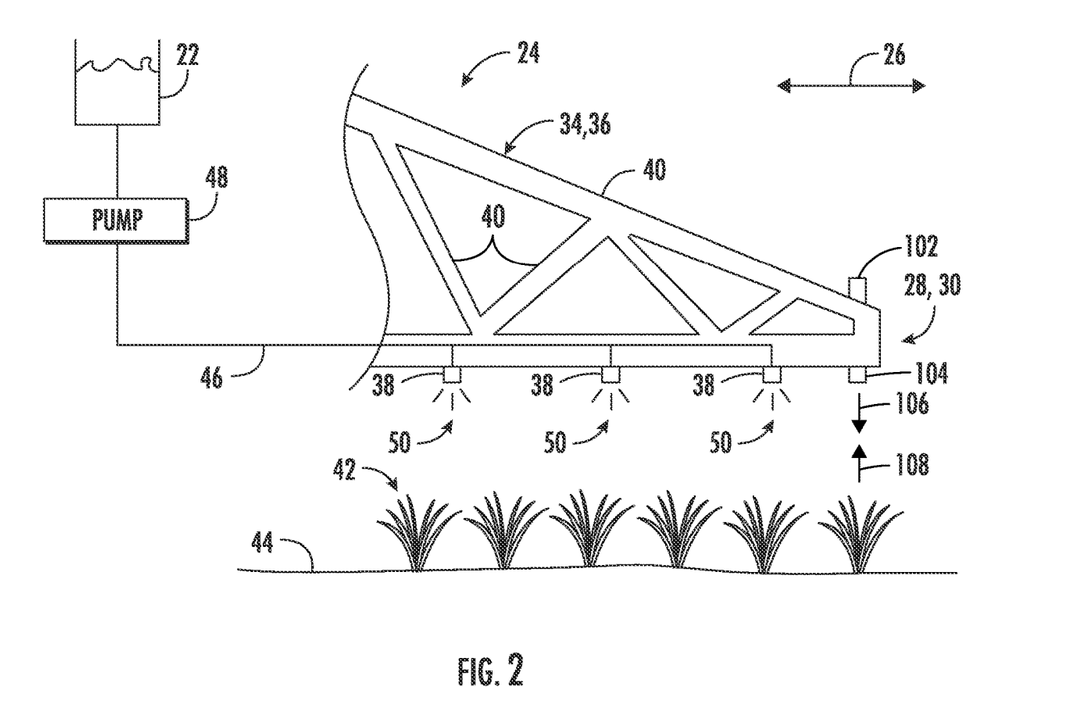
FIG. 2 illustrates a partial front view of one embodiment of a boom assembly of an agricultural sprayer in accordance with aspects of the present subject matter.

FIG. 2 illustrates a partial front view of one embodiment of a boom assembly 24 of the sprayer 10. In general, the boom assembly 24 may include a plurality of structural frame members 40, such as beams, bars, and/or the like. Moreover, as mentioned above, the boom assembly 24 may support a plurality of spray nozzles 38 (also referred to as spray tips). Each spray nozzle 38 may, in turn, be configured to dispense the agricultural fluid stored within the tank 22 onto an underlying crop canopy 42 or an underlying field surface 44. Specifically, as shown, the spray nozzles 38 are mounted on and/or coupled to the frame members 40 such that the spray nozzles 38 are spaced apart from each other in the lateral direction 26. Furthermore, a fluid conduit(s) 46 may fluidly couple the spray nozzles 38 to the tank 22. Moreover, a pump 48 may be configured to receive agricultural fluid from the tank 22 and supply a pressurized flow of the agricultural fluid to the nozzles 38. In this respect, as the sprayer 10 travels across the field in the direction of travel 18 to perform a spraying operation thereon, each spray nozzle 38 may dispense or otherwise spray a fan 50 of the agricultural fluid. The dispensed agricultural fluid may, in turn, be deposited onto the underlying plants crop canopy or field surface in the form droplets.

It should be further appreciated that the configuration of the agricultural sprayer 10 described above and shown in FIGS. 1 and 2 is provided only to place the present subject matter in an exemplary field of use. Thus, it should be appreciated that the present subject matter may be readily adaptable to any manner of agricultural sprayer configuration.

Furthermore, as shown in FIG. 2, the agricultural sprayer 10 may include one or more movement sensors 102. In general, the movement sensor(s) 102 may be configured to capture data indicative of the movement of the boom assembly 24 relative to the sprayer frame 12. As will be described below, the data captured by the movement sensor(s) 102 may be used to determine one or more movement parameters associated with the movement of the boom assembly 24 relative to the sprayer frame 12, such as the pitch, roll, and/or yaw of the boom assembly 24. The movement parameter(s) may, in turn, be used (in combination with other determined parameter(s)) to determine one or more spray deposition parameters indicative of the rate at which the agricultural fluid is deposited on the underlying crop canopy 42 or field surface 44.

The movement sensor(s) 102 may correspond to any suitable sensor(s) or sensing device(s) capable of capturing data indicative of or otherwise detecting movement of the boom assembly 24. For example, in several embodiments, the movement sensor(s) 102 may be an inertial measurement unit(s) (IMU(s)). However, in alternative embodiments, the movement sensor(s) 102 may be any other suitable sensor(s) or sensing device(s), such as a strain gauge(s).

Moreover, the sprayer 10 may include any suitable number of movement sensors 102 and/or the movement sensor(s) 102 may be installed at any suitable location(s) on the sprayer 10. For example, in one embodiment, a movement sensor 102 may be installed on each wing boom 34, 36 adjacent to the corresponding end 28, 30. However, in alternative embodiments, the sprayer 10 may include more or less movement sensors 102 and the movement sensor(s) 102 may be positioned at any other suitable location(s) on the sprayer 10.

In addition, as shown in FIG. 2, the agricultural sprayer 10 may include one or more position sensors 104. In general, the position sensor(s) 104 may be configured to configured to capture data indicative of the distances between the spray nozzles 38 and the underlying crop canopy 42 or field surface 44. As will be described below, the data captured by the position sensor(s) 104 may be used to determine the distance between each spray nozzle 38 and the underlying crop canopy 42 or field surface 44. These distances may, in turn, be used to in combination with the movement parameter(s) to determine the spray deposition parameter(s).

The position sensor(s) 104 may correspond to any suitable sensor(s) or sensing device(s) capable of capturing data indicative of or otherwise detecting the distances between the spray nozzles 38 and the underlying crop canopy 42 or field surface 44. For example, in several embodiments, the position sensor(s) 104 may correspond to a transceiver-based sensor(s), such as an ultrasonic sensor(s). In such embodiments, each position sensor 104 may be configured emit one or more output signal(s) (e.g., as indicated by arrows 106 in FIG. 2) for reflection off of the underlying crop canopy 42 or field surface 44. The output signals 106 are, in turn, reflected by the crop canopy/field surface 42/44 as return signals (e.g., as indicated by arrows 108 in FIG. 2). Moreover, each position sensor 104 may be configured to receive the associated reflected return signal(s) 108. For example, in one embodiment, the sensor(s) 104 may be configured to determine the time-of-flight (TOF) of the associated signals 106, 108, with the TOF being indicative of the distances between the spray nozzles 38 and the crop canopy/field surface 42/44. However, in alternative embodiments, the position sensor(s) 104 may correspond to a radio detection and ranging (RADAR) sensor(s), a light detection and ranging (LIDAR) sensor(s), or any other suitable type of sensors, such as any suitable sensors for detecting the TOF for light or sound beams.

Moreover, the sprayer 10 may include any suitable number of position sensors 104 and/or the position sensor(s) 104 may be installed at any suitable location(s) on the sprayer 10. For example, in one embodiment, a position sensor 104 may be installed on each wing boom 34, 36 adjacent to the corresponding end 28, 30. However, in alternative embodiments, the sprayer 10 may include more or less position sensors 104 and the position sensor(s) 104 may be positioned at any other suitable location(s) on the sprayer 10.

Figure 3:
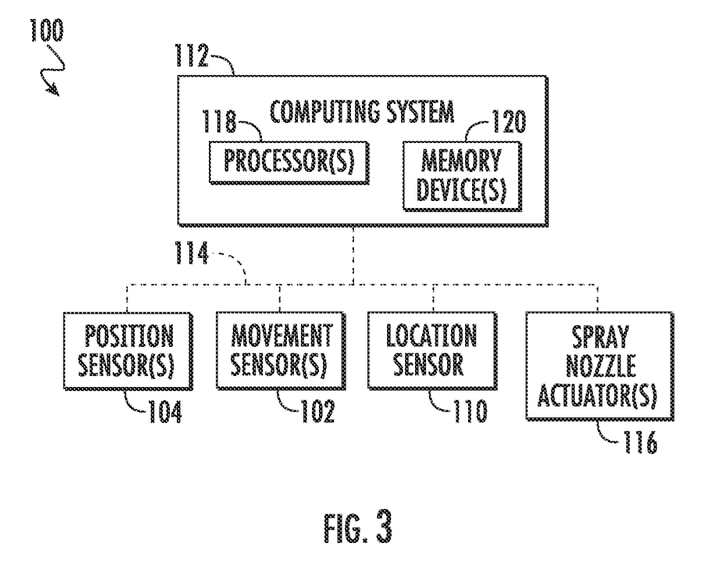
FIG. 3 illustrates a schematic view of one embodiment of a system for monitoring agricultural fluid deposition rate during an agricultural spraying operation in accordance with aspects of the present subject matter.

Referring now to FIG. 3, a schematic view of one embodiment of a system 100 for monitoring agricultural fluid deposition rate during an agricultural spraying operation is illustrated in accordance with aspects of the present subject matter. In general, the system 100 will be described herein with reference to the agricultural sprayer 10 described above with reference to FIGS. 1 and 2. However, it should be appreciated by those of ordinary skill in the art that the disclosed system 100 may generally be utilized with agricultural sprayers having any other suitable sprayer configuration.

As shown in FIG. 3, the system 100 may include a location sensor 110 may be provided in operative association with the agricultural sprayer 10. In general, the location sensor 110 may be configured to determine the location of the sprayer 10 using a satellite navigation positioning system (e.g., a GPS system, a Galileo positioning system, the Global Navigation satellite system (GLONASS), the BeiDou Satellite Navigation and Positioning system, and/or the like). As such, the location determined by the location sensor 110 may be transmitted to a computing system 112 of the system 100 (e.g., in the form coordinates) and stored within the computing system's memory for subsequent processing and/or analysis.

In accordance with aspects of the present subject matter, the system 100 may include a computing system 112 communicatively coupled to one or more components of the sprayer 10 and/or the system 100 to allow the operation of such components to be electronically or automatically controlled by the computing system 112. For instance, the computing system 112 may be communicatively coupled to the movement sensor(s) 102 via a communicative link 114. As such, the computing system 112 may be configured to receive data from the movement sensor(s) 102 that is indicative of the movement of the boom assembly 24 relative to the sprayer frame 12. Moreover, the computing system 112 may be communicatively coupled to the position sensor(s) 104 via the communicative link 114. As such, the computing system 112 may be configured to receive data from the position sensor(s) 104 that is indicative of the movement of the distances between the spray nozzles 38 and the underlying crop canopy or field surface. Furthermore, the computing system 112 may be communicatively coupled to the location sensor 110 via the communicative link 114. As such, the computing system 112 may be configured to receive data from the location sensor 110 that is indicative of the location of the sprayer 10 within the field. Moreover, the computing system 112 may be communicatively coupled to a spray nozzle actuator 116 (e.g., a solenoid or other linear actuator) associated with each spray nozzle 38 via the communicative link 114. In this respect, the computing system 112 may be configured to control the spray nozzle actuators 114 in a manner that controls the operation of the spray nozzles 38. As will be described below, the computing system 112 may be configured to control the nozzle actuators 116 in a manner that independently adjusts the duty cycle of each spray nozzle 38 to dispense the agricultural fluid evenly across the field as field conditions vary. Additionally, the computing system 112 may be communicatively coupled to any other suitable components of the sprayer 10 and/or the system 100.

In general, the computing system 112 may comprise one or more processor-based devices, such as a given controller or computing device or any suitable combination of controllers or computing devices. Thus, in several embodiments, the computing system 112 may include one or more processor(s) 118 and associated memory device(s) 120 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 120 of the computing system 112 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 120 may generally be configured to store suitable computer-readable instructions that, when implemented by the processor(s) 118, configure the computing system 112 to perform various computer-implemented functions, such as one or more aspects of the methods and algorithms that will be described herein. In addition, the computing system 112 may also include various other suitable components, such as a communications circuit or module, one or more input/output channels, a data/control bus and/or the like.

The various functions of the computing system 112 may be performed by a single processor-based device or may be distributed across any number of processor-based devices, in which instance such devices may be considered to form part of the computing system 112. For instance, the functions of the computing system 112 may be distributed across multiple application-specific controllers or computing devices, such as a navigation controller, an engine controller, and/or the like.

Figure 4:
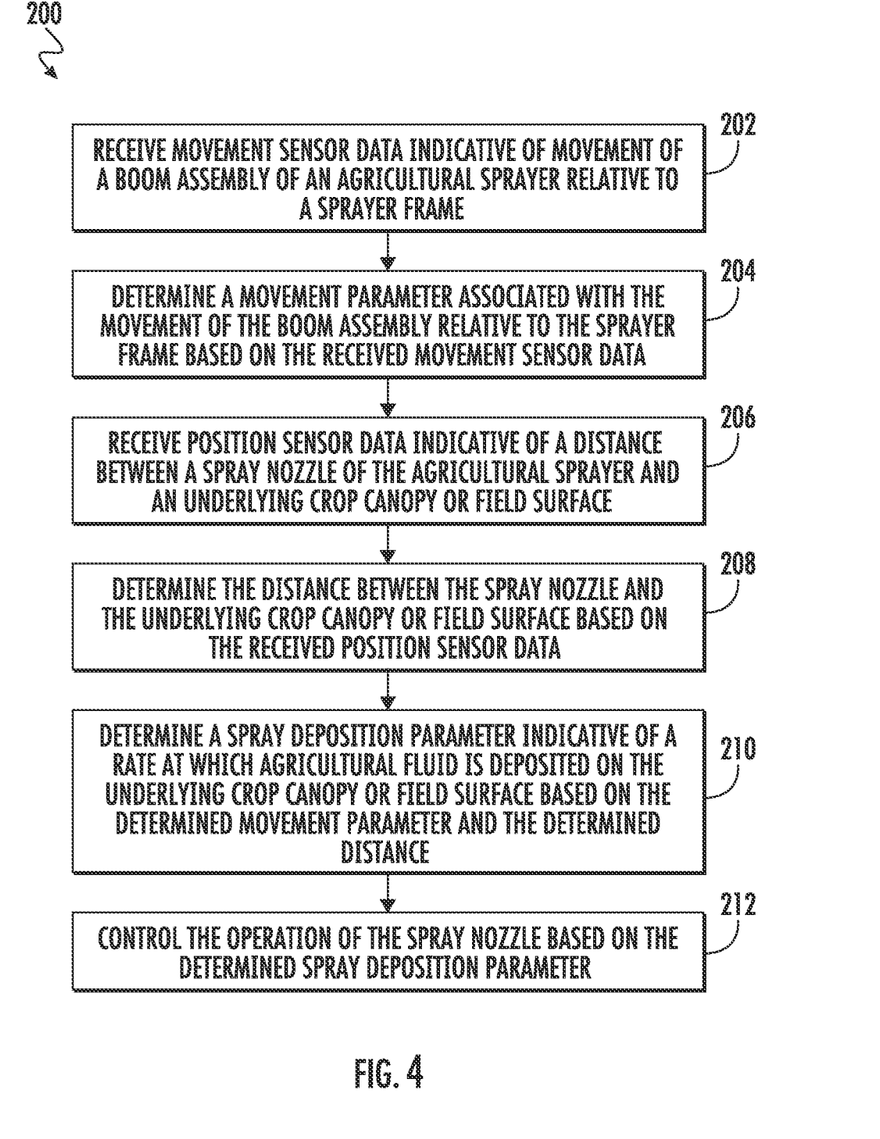
FIG. 4 illustrates a flow diagram of one embodiment of a method for monitoring agricultural fluid deposition rate during an agricultural spraying operation using an agricultural sprayer in accordance with aspects of the present subject matter.

Referring now to FIG. 4, a flow diagram of one embodiment of a method 200 for monitoring agricultural fluid deposition rate during an agricultural spraying operation is illustrated in accordance with aspects of the present subject matter. In general, the method 200 will be described herein with reference to the agricultural sprayer 10 and the system 100 described above with reference to FIGS. 1-3. However, it should be appreciated by those of ordinary skill in the art that the disclosed method 200 may generally be implemented with any agricultural sprayer having any suitable sprayer configuration and/or within any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 includes receiving, with a computing system, movement sensor data indicative of movement of a boom assembly of an agricultural sprayer relative to a sprayer frame. For example, in several embodiments, as the sprayer 10 travels across a field to perform a spraying operation thereon, the computing system 112 may receive data indicative of the movement of the boom assembly 24 of the agricultural sprayer 10 relative to the sprayer frame 12 from the movement sensor(s) 102 (e.g., via the communicative link 114).

Additionally, at (204), the method 200 includes determining, with the computing system, a movement parameter associated with the movement of the boom assembly relative to the sprayer frame based on the received movement sensor data. For example, in several embodiments, the computing system 110 may analyze the data received from the movement sensor(s) 102 at (202) to determine one or more movement parameters associated with the movement of the boom assembly 24 relative to the sprayer frame 12. For example, the computing system 112 may include a look-up table(s), suitable mathematical formula, and/or an algorithm(s) stored within its memory device(s) 120 that correlates the received movement sensor data to the movement parameter(s). In some embodiments, the determined movement parameter(s) may correspond to the pitch, roll, and/or yaw of the boom assembly 24. However, in alternative embodiments, the determined movement parameter(s) may correspond to any other suitable parameter(s) associated with the movement of the boom assembly 24.

Furthermore, as shown in FIG. 4, at (206), the method 200 includes receiving, with the computing system, position sensor data indicative of a distance between a spray nozzle of the agricultural sprayer and an underlying crop canopy or field surface. For example, in several embodiments, as the sprayer 10 travels across a field to perform the spraying operation, the computing system 112 may receive data indicative of the positions of the spray nozzles 38 and the underlying crop canopy or field surface from the position sensor(s) 104 (e.g., via the communicative link 114).

Moreover, at (208), the method 200 includes determining, with the computing system, the distance between the spray nozzle and the underlying crop canopy or field surface based on the received position sensor data. For example, in several embodiments, the computing system 112 may analyze the data received from the position sensor(s) 104 at (206) to determine the distance between each spray nozzle 38 and the underlying crop canopy or field surface. For example, the computing system 112 may include a look-up table(s), suitable mathematical formula, and/or an algorithm(s) stored within its memory device(s) 120 that correlates the received position sensor data to the distance between each spray nozzle 38 and the underlying crop canopy or field surface.

In addition, as shown in FIG. 4, at (210), the method 200 includes determining, with the computing system, a spray deposition parameter indicative of a rate at which agricultural fluid is deposited on the underlying crop canopy or field surface based on the determined movement parameter and the determined distance. More specifically, in several embodiments, the computing system 112 may be configured to determine one or more spray deposition parameters based on the movement parameter(s) determined at (204) and the distances between the spray nozzles 38 and the crop canopy/field surface determined at (208). For example, the computing system 112 may include a look-up table(s), suitable mathematical formula, and/or an algorithm(s) stored within its memory device(s) 120 that correlates the determined movement parameter(s) and distances to the spray deposition parameter(s).

The spray deposition parameter(s) may correspond to any suitable parameters associated with the rate at which agricultural fluid is deposited on the underlying crop canopy or field surface. For example, in some embodiments, the spray deposition parameter(s) may be the density(ies) of the droplets of the agricultural fluid deposited on the underlying crop canopy or field surface, such as the number of droplets per unit area of deposited on for one or more portions of the crop canopy/field surface.

Additionally, each spray deposition parameter may be associated with a portion of the underlying crop canopy or field surface. For example, in one embodiment, the computing system 112 may be configured to determine a spray deposition parameter (e.g., a droplet density) for several portions of the field, with each portion corresponding to one of the spray nozzles 38. In such an embodiment, each spray deposition parameter may generally be indicative of the rate at which the agricultural fluid is being deposited onto the crop canopy/field surface by one of the spray nozzles 38. Thus, as will be described below, each spray nozzle 38 can be individually controlled to adjust the rate at which the agricultural fluid is being deposited onto the crop canopy/field surface each spray nozzle 38 as the conditions within the field (e.g., the wind) change and cause the boom assembly 24 to move relative to sprayer frame 12.

Determining the spray deposition parameter(s) based on the movement parameter(s) (i.e., the movement sensor data) and the distances between the spray nozzles 38 and the crop canopy/field surface (i.e., the position sensor data) may allow the spray deposition parameter(s) to be accurately determined. More specifically, the movement sensor data cannot be used to accurately determine spray droplet density of the agricultural fluid deposited on the crop canopy/field surface alone. That is, such data does not account for the distance between each spray nozzle 38 and the crop canopy/field surface, which can affect the droplet density. For example, the droplet density is concentrated over a smaller area when the spray nozzles 38 are closer to the crop canopy/field surface than when the spray nozzles 38 are farther away. Additionally, the position sensor data cannot be used to accurately determine spray droplet density of the agricultural fluid deposited on the crop canopy/field surface alone. That is, such data does not account for the forward and backward movement of the boom assembly 24 relative to the sprayer frame that causes tiger-striping. However, using both the movement sensor and position sensor data may generally provide an indication of where each spray nozzle 38 is located within three-dimensional space relative to the sprayer frame 12 and the crop canopy/field surface, thereby allowing the spray deposition parameter(s) (e.g., the droplet density(ies)) to be accurately determined.

Furthermore, determining the spray deposition parameter(s) based on the movement parameter(s) (i.e., the movement sensor data) and the distances between the spray nozzles 38 and the crop canopy/field surface (i.e., the position sensor data) may generally reduce the computing resources needed to make such determinations. More specifically, conventional systems and methods generally rely on the analysis of captured image data to determine droplet density or other related spray deposition parameters. Such analysis of image data is time-consuming and requires a large amount of the computing resources. Computing resources may generally be limited on sprayers and other agricultural vehicles. However, by using sensor data (e.g., electric signals from a transceiver-based sensor(s) and IMU(s)) that is less computationally intensive to analyze than image data, the disclosed system and method can determine the spray deposition parameter(s) using fewer computing resources and in less time than conventional systems and methods.

In some embodiments, at (210), the method 200 may further include geo-locating the determined spray deposition parameter(s) within the field. More specifically, as the sprayer 10 travels across the field, the computing system 112 may be configured to receive location data (e.g., coordinates) from the location sensor 110 (e.g., via the communicative link 114). Based on the known dimensional configuration and/or relative positioning between the boom assembly 24, the spray nozzles 38, and the location sensor 110, the computing system 112 may geo-locate each determined spray deposition parameter within the field. For example, in one embodiment, the coordinates derived from the location sensor 110 and the spray deposition parameter determinations may both be time-stamped. In such an embodiment, the time-stamped data may allow the deposition parameter determinations to be matched or correlated to a corresponding set of location coordinates received or derived from the location sensor 110. Additionally, in some embodiments, the computing system 112 may be configured to generate a field map identifying the spray deposition parameter at one or more locations within the field.

As used herein, a "field map" may generally correspond to any suitable dataset that correlates data to various locations within a field. Thus, for example, a field map may simply correspond to a data table that correlates the spray deposition parameters to various locations along the swath being mapped. Alternatively, a field map may correspond to a more complex data structure, such as a geospatial numerical model that can be used to identify spray deposition parameters and classify such parameters into geographic zones or groups. In one embodiment, the computing system 112 may be configured to generate a graphically displayed map or visual indicator for display to the operator of the sprayer 10 (e.g., via a suitable display screen or other the user interface (not shown)).

Moreover, in some embodiments, at (210), the method 200 may include generating a field map illustrating the movement of the boom assembly 24 relative to the underlying crop canopy or field surface based on the determined movement parameter(s). More specifically, as described above, the computing system 112 may determine one or more movement parameters associated with the movement of the boom assembly 24, such as its pitch, roll, and/or yaw, based on the data received from the movement sensor(s) 102. The movement parameter(s) may, in turn, provide an indication of the location of the boom assembly 24 within the horizontal plane as the boom assembly 24 moves forward and backward (i.e., relative to the direction of travel 18). In this respect, the computing system 112 may generate a field map illustrating the movement of the boom assembly 24 relative to the underlying crop canopy or field surface. For example, in one embodiment, such a field map may provide a boom assembly "trace" indicating frequency at which the boom assembly 24 was located at specific positions of the crop canopy/field surface.

In addition, at (212), the method 200 includes controlling, with the computing system, the operation of a spray nozzle of the agricultural sprayer based on the determined spray deposition parameter. In several embodiments, the computing system 112 may be configured to independently control the operation of the spray nozzles 38 based on the determined spray deposition parameter(s) such that the agricultural fluid is dispensed uniformly and in the desired amount across the field as the boom assembly 24 moves relative to the sprayer frame 12. Specifically, in several embodiments, based on the determined spray deposition parameter(s), the computing system 112 may transmit control signals to the spray nozzle actuators 116 (e.g., via the communicative link 114). The control signals may, in turn, instruct the actuators 116 to independently control the duty cycle or pulse width modulation of the spray nozzles 38. For example, when wind causes boom assembly 24 to move forward and backward, the duty cycle of the spray nozzles 38 may adjusted to prevent tiger-striping.

As described above, the determination of the spray deposition parameter(s) based on the captured movement and position sensor data requires fewer computing resources and less time than the analysis of image data. As such, the disclosed system and method allow for the operation of the spray nozzles 38 to be adjusted more quickly in response to undesirable agricultural fluid deposition (e.g., droplet density) on the crop canopy/field surface, thereby allowing for more even deposition of the agricultural fluid across the field to improve the effectiveness of the agricultural fluid.

It is to be understood that the steps of the method 200 are performed by the computing system 100 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 100 described herein, such as the method 200, is implemented in software code or instructions which are tangibly stored on a tangible computer readable medium. The computing system 100 loads the software code or instructions via a direct interface with the computer readable medium or via a wired and/or wireless network. Upon loading and executing such software code or instructions by the computing system 100, the computing system 100 may perform any of the functionality of the computing system 100 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring agricultural fluid deposition rate during an agricultural spraying operation, the system comprising:
   a sprayer frame;
   a boom assembly coupled to the sprayer frame, the boom assembly extending in a lateral direction between a first end of the boom assembly and a second end of the boom assembly, the lateral direction being perpendicular to a direction of travel of the sprayer frame;
   a spray nozzle supported on the boom assembly, the spray nozzle configured to dispense an agricultural fluid onto an underlying crop canopy or field surface;
   a movement sensor configured to capture data indicative of movement of the boom assembly relative to the sprayer frame;
   a position sensor configured to capture data indicative of a distance between the spray nozzle and the underlying crop canopy or field surface; and
   a computing system communicatively coupled to the movement sensor and the position sensor, the computing system configured to:
      determine a movement parameter associated with the movement of the boom assembly relative to the sprayer frame based on the data captured by the movement sensor;
      determine the distance between the spray nozzle and the underlying crop canopy or field surface based on the data captured by the position sensor; and
      determine a density of droplets of the agricultural fluid being deposited on the underlying crop canopy or field surface based on the determined movement parameter, the determined distance, at least one of a look-up table or a mathematical formula, and without using image data.

2. The system of claim 1, wherein the movement parameter comprises at least one of a pitch, a roll, or a yaw of the boom assembly.

3. The system of claim 1, wherein the computing system is further configured to control an operation of the spray nozzle based on the determined density of droplets.

4. The system of claim 1, further comprising:
   a location sensor configured to capture data indicative of a location of the spray nozzle within a field, wherein the computing system is further configured to geo-locate the determined density of droplets within the field.

5. The system of claim 4, wherein the computing system is further configured to generate a field map identifying the density of droplets at one or more locations within the field.

6. The system of claim 4, wherein the computing system is further configured to generate a field map illustrating the movement of the boom assembly relative to the underlying crop canopy or field surface based on the determined movement parameter.

7. The system of claim 1, wherein the movement sensor comprises an inertial measurement unit.

8. The system of claim 1, wherein the position sensor comprises a transceiver-based sensor.

9. An agricultural sprayer, comprising:
   a frame;
   a boom assembly coupled to the frame, the boom assembly extending in a lateral direction between a first end of the boom assembly and a second end of the boom assembly, the lateral direction being perpendicular of a direction of travel of the agricultural sprayer;
   a plurality of spray nozzles supported on the boom assembly and spaced apart from each other in the lateral direction, each spray nozzle configured to dispense an agricultural fluid onto an underlying crop canopy or field surface;
   one or more movement sensors configured to capture data indicative of movement of the boom assembly relative to the sprayer frame;
   one or more position sensors configured to capture data indicative of a distance between each spray nozzle and the underlying crop canopy or field surface; and
   a computing system communicatively coupled to the one or more movement sensor and the one or more position sensors, the computing system configured to:
      determine a movement parameter associated with the movement of the boom assembly relative to the sprayer frame based on the data captured by the one or more movement sensors;
      determine the distance between each spray nozzle and the underlying crop canopy or field surface based on the data captured by the one or more position sensors; and
      determine one or more densities of droplets based on the determined movement parameter, the determined distance, at least one of a look-up table or a mathematical formula, and without using image data, each density of droplets being associated with a portion of the underlying crop canopy or field surface and indicative of rate at which the agricultural fluid is deposited on the corresponding portion of the underlying crop canopy or field surface.

10. The agricultural sprayer of claim 9, wherein the computing system is further configured to independently control an operation of each spray nozzle based on the one or more determined densities of droplets.

11. A method for monitoring agricultural fluid deposition rate during an agricultural spraying operation performed by an agricultural sprayer, the agricultural sprayer including a frame, a boom assembly coupled to the frame, and a spray nozzle supported on the boom assembly, the spray nozzle configured to dispense an agricultural fluid onto an underlying crop canopy or field surface, the method comprising:
   receiving, with a computing system, movement sensor data indicative of movement of the boom assembly relative to the sprayer frame;
   determining, with the computing system, a movement parameter associated with the movement of the boom assembly relative to the sprayer frame based on the received movement sensor data;
   receiving, with the computing system, position sensor data indicative of a distance between the spray nozzle and the underlying crop canopy or field surface;
   determining, with the computing system, the distance between the spray nozzle and the underlying crop canopy or field surface based on the received position sensor data;
   determining, with the computing system, density of droplets of the agricultural fluid being deposited on the underlying crop canopy or field surface based on the determined movement parameter, the determined distance, at least one of a look-up table or a mathematical formula, and without using image data; and
   controlling, with the computing system, an operation of the spray nozzle based on the determined density of droplets.

12. The method of claim 11, wherein the movement parameter comprises at least one of a pitch, a roll, or a yaw of the boom assembly.

13. The method of claim 11, further comprising:
receiving, with the computing system, location sensor data indicative of a location of the spray nozzle within a field; and
geo-locating, with the computing system, the determined spray deposition parameter density of droplets within the field.

14. The method of claim 13, further comprising:
generating, with the computing system, a field map identifying the density of droplets at one or more locations within the field.

15. The method of claim 13, further comprising:
generating, with the computing system, a field map illustrating the movement of the boom assembly relative to the underlying crop canopy or field surface based on the determined movement parameter.

16. The method of claim 11, wherein receiving the movement sensor data comprises receiving, with the computing system, the movement sensor data from an inertial measurement unit.

17. The method of claim 11, wherein receiving the position sensor data comprises receiving, with the computing system, the position sensor data from a transceiver-based sensor.

* * * * *